United States Patent Office 3,431,086
Patented Mar. 4, 1969

3,431,086
PROCESS FOR PREPARING MINERAL ION EXCHANGERS AND EXCHANGERS SO OBTAINED
Léon Henri Baetsle and Daniel Joseph Huys, Mol, Belgium, assignors to Studiecentrum Voor Kernenergie S.C.K., a Belgian public utility establishment
Filed June 21, 1965, Ser. No. 465,501
Claims priority, application Belgium, June 25, 1964, 649,746
U.S. Cl. 23—315     5 Claims
Int. Cl. C01b 29/00; C22b 59/00

ABSTRACT OF THE DISCLOSURE

An alkali metal antimonate is mixed with hydrochloric or nitric acid and the acidity adjusted to 1 M; upon standing a precipitate of hydrated antimony oxide (polyantimonic acid) forms, which is filtered, washed with 1 M HCl, and dried in air followed by heating to 100° C. Chlorosulfonic acid, sulfuric acid, telluric acid or phosphoric acid, may also be included in the antimonate-acid mixture before adjusting the acid level thereby producing a precipitate incorporating the anion of the added acid.

These products are stable in HCl or $HNO_3$ solutions from about 2–3 M to substantially neutral, and exhibit interesting and useful ion exchange properties, with a pronounced selectivity for $Sr^{++}$ in acid media.

---

This invention relates to a process for preparing mineral ion exchangers based on polyantimonic acid or polyantimonic salts.

It is known to mix zirconium oxychloride with antimony pentachloride and to neutralise with ammonium hydroxide, thereby precipitating an ion exchanger known as "zirconium antimonate" however said precipitate has only low specific properties as ion exchanger in acid medium, except with respect to alkali metals.

According to the present invention, there is prepared a synthetic inorganic ion exchange material capable of separating either alkaline-earth metals, particularly strontium, or lanthanides from other ions (alkali metals or transition metals), in HCl or $HNO_3$ 0.2 to 2 M.

This material is polyantimonic acid produced by precipitation from an admixture of an aqueous antimonate solution with a mineral acid, preferably HCl or $HNO_3$, at a 1 M acid concentration.

In an advantageous embodiment of the invention, a solution of potassium pyroantimonate is acidified in water, by means of a mineral acid.

Preferably use is made as mineral acid of one of the following acids: hydrochloric acid, chlorosulfonic acid, telluric acid and phosphoric acid.

In a particular embodiment of the invention, final molar ratio of $SO_4/Sb$, $TeO_4/Sb$ or $PO_4/Sb$ is brought to 2.5 and final acidity level is eventually regulated by means of HCl or $HNO_3$ to 1 M.

According to another embodiment of the invention, sodium or potassium antimonate is dissolved in strong HCl, a solution of a mineral acid is added and treatment is made with $NH_4OH$ to acidity equivalent to HCl 1 M.

In a particularly preferred embodiment of the invention, precipitate is washed with HCl 1 M and then one dries at room temperature.

In an advantageous embodiment of the invention, the product dried by ambient air is then dried at a temperature of 100° C. for a short time.

Other details and advantages of the invention will become apparent from the description which will be given hereinafter of several embodiments of a process according to the invention for preparing mineral ion exchangers based on polyantimonic acid or polyantimonic salts, and of mineral ion exchangers prepared by means of said process.

Said description is given only by way of example and does not limit the invention.

According to a first embodiment of a process of the invention, potassium pyroantimonate $KSb(OH)_6$ is dissolved in water. The low solubility of said reagent limits concentration thereof in solution of 0.2 M. Said solution is named solution A. Concentrated chlorosulfonic acid, diluted sulfuric acid, telluric acid and phosphoric acid form solutions $B_1$, $B_2$, $B_3$ and $B_4$ respectively.

Solution A is acidified with hydrochloric acid or nitric acid, after addition or not of one of solutions $B_1$, $B_2$, $B_3$ and $B_4$.

Final acidity level of the suspension is regulated until acdity of HCl or $HNO_3$ 1 M.

If a solution $B_1$, $B_2$, $B_3$ or $B_4$ is added to solution A, amounts are adapted until the final mineral acid/Sb molar ratio is equal to 2.5.

If only hydrochloric acid or nitric acid is added to solution A, a precipitate of polyantimonic acid is obtained. If solution $B_1$ or $B_2$ is added to solution A, so as to acidify by means of hydrochloric acid or nitric acid, sulfate of polyantimonic acid is obtained. By using solution $B_3$, tellurate of polyantimonic acid is obtained and by using solution $B_4$, phosphate of polyantimonic acid is obtained.

In each case, precipitate is filtered, washed with HCl 1 M and then the product is dried at room temperature. The product, which is thus dried by air, is then dried at 100° C. for a short time.

Figure 1:
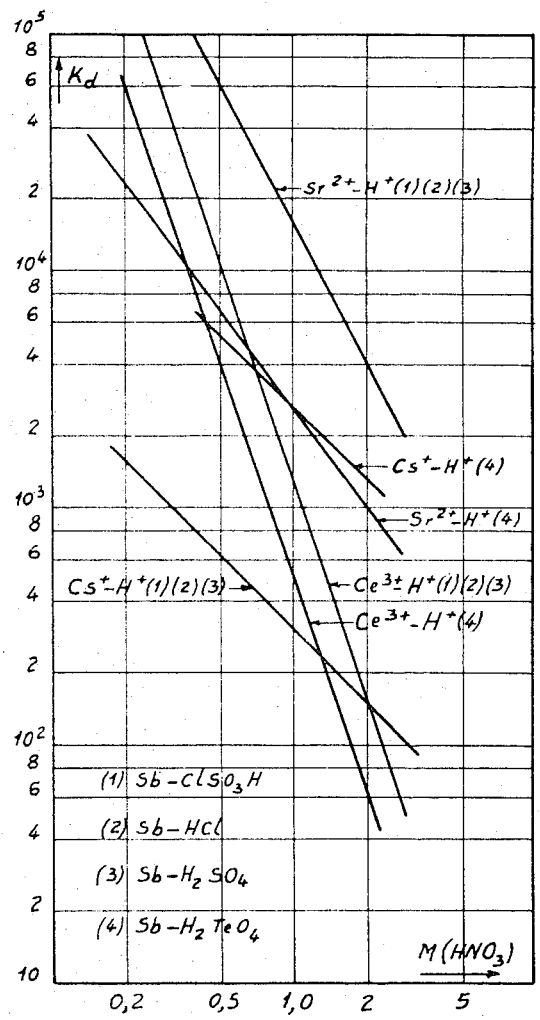
FIG. 1 shows a diagram relating to distribution coefficients of $Cs^+$, $Sr^{++}$ and $Ce^{+++}$ on polyantimonic acids.

Distribution coefficients for $Sr^{89}$, $Ce^{144}$ and $Cs^{134}$ are shown in FIG. 1 using polyantimonic acid ion exchangers prepared as described above with (1) HCl and $ClSO_3H$, (2) HCl alone, (3) HCl and $H_2SO_4$, and (4) HCl and $H_2TeO_4$.

It may be deduced from these curves that addition of chlorosulfonic acid or sulfuric acid (solution $B_1$ and $B_2$) has only a low influence on specific properties of ion exchanger.

Figure 2:
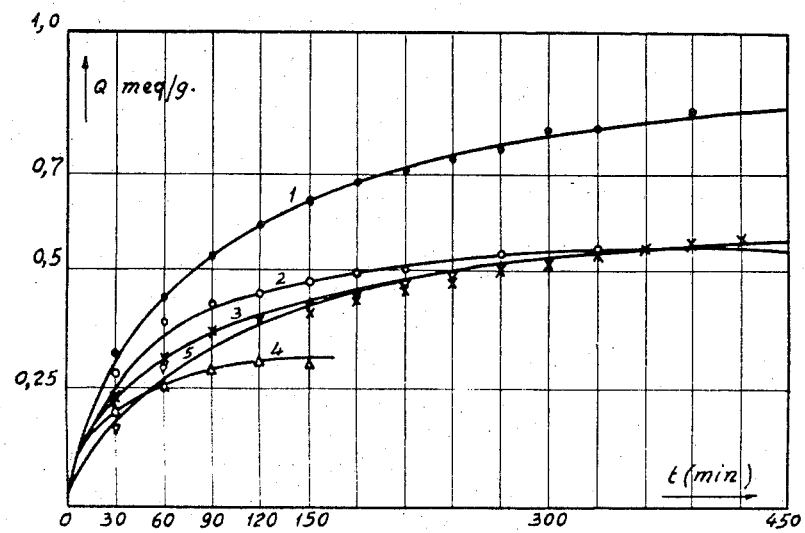
FIG. 2 shows the load curve of various polyantimonates.

FIG. 2 shows load curves corresponding to various polyantimonates obtained according to the invention. Particularities relating to said FIG. 2 are given hereinafter.

| | Capacity, meq./g. | Time, ½ min. |
|---|---|---|
| Curve 1—Sb-$H_2TeO_4$ | 0.85 | 56 |
| Curve 2—Sb-$HClSO_3$ | 0.55 | 37 |
| Curve 3—Sb-$H_2SO_4$ | 0.55 | 45 |
| Curve 4—Sb-$H_3PO_4$ | 0.31 | 17 |
| Curve 5—Sb-HCl | 0.55 | 60 |

Solution _____ 62.5 p.p.m. $Sr^{++}$ in $HNO_3$ 0.5 M.
Diameter of particles _____ 50–80 mesh ASTM.
Output _____ 50 ml./min.
Temperature _____ 25° C.
t½ _____ Time for half fill-out of loading the reaction.

In FIG. 2, contact time is measured along the abscissa and capacity in milliequivalents along the ordinate.

It is seen that telluric acid (solution $B_3$) increases absorption capacity of the polyantimonate. Addition of telluric acid has however a disadvantageous influence on the specific quality of the ion exchange reaction.

Figure 3:
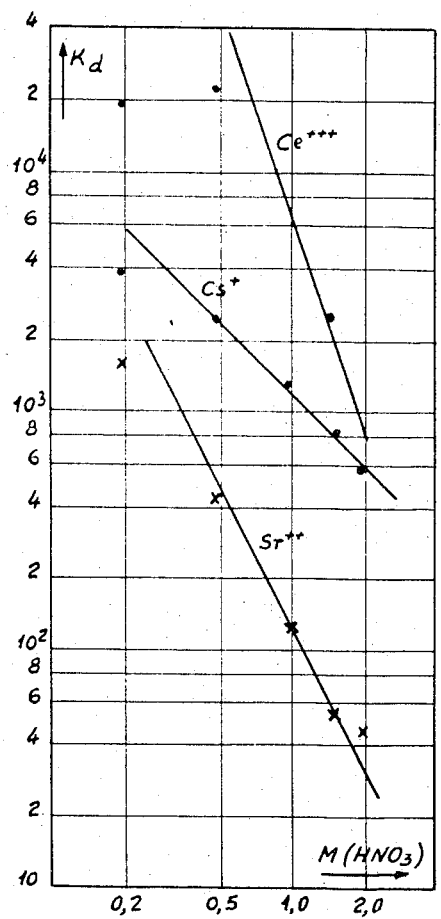
FIG. 3 shows distribution coefficients of Cs, Sr and Ce on phosphate-polyantimonate.

As it may be deduced from FIG. 3, which is similar to FIG. 1 and relates to the distribution coefficients of cesium, strontium and cerium, the addition of phosphoric acid ($B_4$) entirely modifies the specific quality of polyantimonate, which prefers lanthanides ($Ce^{144}$) to alkali metals ($Cs^{134}$) and alkaline-earth metals ($Sr^{89}$).

Chemically, all the products obtained have a great stability extending from a strongly acid level (HCl or $HNO_3$ 2 to 3 M) to a neutral level (pH of 7).

Said products are particularly able to selectively isolate $Sr^{90}$ or lanthanides from solutions containing mixed fission products dissolved in $HNO_3$ 0.1 to 2 M. The presence of large amounts of other ions, such as those of Fe or Al only slightly affects fixation.

In another preparation of the same ion exchangers, one starts from sodium antimonate ($NaH_2Sb_2O_7$) dissolved in HCl 6 M. To this solution, either only $NH_4OH$ or $NH_4OH$ and one of the solutions $B_1$, $B_2$, $B_3$ and $B_4$ are added. In this case, ratios between $SO_4$, $TeO_4$ and $PO_4$ on the one hand and Sb on the other hand, given hereinbefore, will be taken into account. Addition of $NH_4OH$ decreases acidity level to a value corresponding to HCl 1 M. As ion exchanger, polyantimonic acid, sulfate of polyantimonic acid, polyantimonic tellurate or phosphate of antimonic acid is obtained according to addition of $NH_4OH$ or addition of $NH_4OH$ and one of the solutions $B_1$, $B_2$, $B_3$ and $B_4$.

In this preparation, the precipitate is also filtered and dried in the way previously described.

The invention is in no way limited to the embodiments described hereinbefore and, within the scope of the present invention, many changes may be brought to the embodiments described.

We claim:

1. A method for preparing a synthetic inorganic ion exchange material which comprises:
   (I) admixing (A) an aqueous solution of sodium antimonate or potassium antimonate with (B) hydrochloric acid, the amounts of (A) and (B) being such as to form a reaction mixture with a final acidity level of (B) of 1 M, thereby precipitating polyantimonic acid,
   (II) filtering the reaction mixture to separate the said precipitate,
   (III) washing the separated precipitate with HCl 1 M, and
   (IV) drying the washed precipitate to recover the said polyantimonic acid as a solid product.

2. A method for preparing a synthetic inorganic ion exchange material which comprises:
   (I) admixing (A) an aqueous potassium pyroantimonate ($KSb(OH)_6$) solution with (B) a mineral acid selected from the group consisting of chlorosulfonic acid, sulfuric acid, telluric acid and phosphoric acid and (C) a mineral acid from the group consisting of hydrochloric acid and nitric acid the amounts of (A), (B) and (C) being such as to form a reaction mixture with a final acidity level of hydrochloric acid or nitric acid of 1 M and a final molar ratio of $SO_4/Sb$, $TeO_4/Sb$ or $PO_4/Sb$ of 2.5, thereby precipitating polyantimonic acid having anions of (B),
   (II) filtering the mixture to separate the said precipitate,
   (III) washing the separated precipitate with HCl 1 M, and
   (IV) drying the washed precipitate to recover the said polyantimonic acid as a solid product.

3. A method for preparing a synthetic inorganic ion exchange material which comprises:
   (I) admixing (A) sodium antimonate ($NaH_2Sb_2O_7$) with (B) HCl and (C) $NH_4OH$, the amounts of (A) (B) and (C) being such as to form a reaction mixture with a final acidity level of HCl of 1 M, thereby precipitating polyantimonic acid,
   (II) filtering the mixture to separate the said precipitate,
   (III) washing the separated precipitate with HCl 1 M, and
   (IV) drying the washed precipitate, to recover polyantimonic acid as a solid product.

4. A method for preparing a synthetic inorganic ion exchange material which comprises:
   (I) admixing (A) sodium antimonate ($NaH_2Sb_2O_7$) with (B) HCl (C) $NH_4OH$ and (D) a mineral acid selected from the group consisting of chlorosulfonic acid, sulfuric acid, telluric acid and phosphoric acid, the amounts of (A) (B) (C) and (D) being such as to form a reaction mixture with a final acidity level of HCl of 1 M, and a final molar ratio $SO_4/Sb$, $TeO_4/Sb$ or $PO_4/Sb$ of 2.5, thereby precipitating polyantimonic acid having anions of (D),
   (II) filtering the mixture to separate the said precipitate,
   (III) washing the separated precipitate with HCl 1 M, and
   (IV) drying the washed precipitate to recover the said polyantimonic acid as a solid product.

5. A method as claimed in claim 2, wherein the precipitate is first dried by ambient air and then heated to 100° C. for a short time.

References Cited

Jacobson: "Encyclopedia of Chemical Reactions," vol. 1, Reinhold Publishing Corp., New York, 1946, pp. 192 and 193.

Mellor: "A Comprehensive Treatise on Inorganic and Theoretical Chemistry," vol IX, Longmans, Green & Co., New York, 1929, pp. 441–445.

OSCAR R. VERTIZ, *Primary Examiner.*

H. T. CARTER, *Assistant Examiner.*

U.S. Cl. X.R.

23—23, 50, 53, 139, 144; 252—184